US006985531B2

(12) United States Patent
McCarty, Jr.

(10) Patent No.: US 6,985,531 B2
(45) Date of Patent: Jan. 10, 2006

(54) DUAL DOMAIN DIFFERENTIAL ENCODER/DECODER

(75) Inventor: Robert J. McCarty, Jr., Plano, TX (US)

(73) Assignee: CynTrust Communications, Inc., Dallas, TX (US)

( * ) Notice: Subject to any disclaimer, the term of this patent is extended or adjusted under 35 U.S.C. 154(b) by 969 days.

(21) Appl. No.: 09/904,933

(22) Filed: Jul. 13, 2001

(65) Prior Publication Data

US 2003/0016622 A1    Jan. 23, 2003

(51) Int. Cl.
*H04B 14/06*    (2006.01)
(52) U.S. Cl. .................. 375/244; 375/283; 375/330; 341/143
(58) Field of Classification Search ............... 375/244, 375/246, 283, 330, 308, 247; 370/206, 208, 370/210; 329/304, 345; 332/103, 144; 341/143
See application file for complete search history.

(56) References Cited

U.S. PATENT DOCUMENTS

| | | | |
|---|---|---|---|
| 5,646,935 A * | 7/1997 | Ishikawa et al. | 370/207 |
| 5,771,224 A * | 6/1998 | Seki et al. | 370/206 |
| 6,058,101 A | 5/2000 | Huang et al. | |
| 6,061,327 A | 5/2000 | Demoulin et al. | |
| 6,111,919 A | 8/2000 | Yonge, III | |
| 6,115,354 A | 9/2000 | Weck | |
| 6,363,084 B1 * | 3/2002 | Dejonghe | 370/480 |
| 2002/0150036 A1 * | 10/2002 | Weerackody | 370/208 |

FOREIGN PATENT DOCUMENTS

| EP | 0 920 163 A2 * | 6/1999 |
|---|---|---|
| EP | 0 991 237 A1 * | 4/2000 |
| WO | WO 99/53667 | * 10/1999 |

OTHER PUBLICATIONS

Van Nee, Prasad, ODFM for Wireless Multimedia Communications pp. 107-116, Artech House (2000).

* cited by examiner

*Primary Examiner*—Young T. Tse
(74) *Attorney, Agent, or Firm*—Dan Brown Law Office; Daniel R. Brown (57) ABSTRACT

A method and apparatus that differentially encodes and decodes data symbols in dual domains is taught. Data packets are encoded, transmitted, and decoded during a plurality of symbol intervals on a plurality of sub-carriers. Encoding and decoding are accomplished across both the time and frequency domains such that the minimum number of carrier states are employed as reference only states that do not encode a symbol of data in and of themselves. A rule of adjacency is followed, both across time and frequency, so that decorrelation is minimized. Any modulation scheme that is applicable to differential encoding and decoding can be utilized. Communication systems that couple via radio waves, through metallic conductors, or over fiber optic paths can be employed.

8 Claims, 8 Drawing Sheets

DUAL DOMAIN DIFFERENTIAL ENCODER/DECODER

BACKGROUND OF THE INVENTION

1. Field of the Invention

The present invention relates to data communications. More specifically, the present invention relates to differentially encoded and decoded communications systems that communicate information across a plurality of sub-carriers within intermittently transmitted blocks of information.

2. Description of the Related Art

Modern communications systems have advantageously employed the use of multiple sub-carriers as a means of utilizing available bandwidth. Two examples of such use include orthogonal frequency division multiplexed systems ("OFDM") and multiple-carrier transmission systems ("MCT"). In multiple-carrier transmission and OFDM systems, a given portion of bandwidth is sub-divided into several sub-bands and information is modulated onto each of the sub-bands. MCT systems are particularly suitable for the implementation of a frequency division multiplexed multiple access ("FDMA") systems.

FDMA system protocols service several individual users over one frequency band by devoting particular frequency slots to specific users or uses. This is by frequency division multiplexing the information associated with different users or uses. Knowledge of the frequency slot in which any specific information resides permits reconstruction of each user's information at the receiving end of the communication channel. This multiplexing is independent of the information encoding, or modulation, scheme employed. It is also known in the art to time division multiplex and provide multiple user access ("TDMA") within the aforementioned FDMA structure.

OFDM systems address a problem that is faced, for example, when pulsed or intermittent signals are transmitted in FDMA, and certain other formats. In accordance with principles well known in the communication sciences, the limited time duration of such signals inherently broadens the bandwidth of the signal in frequency space. Accordingly, adjacent frequency sub-channels may significantly overlap, defeating the use of frequency as a user or purpose identifying parameter. However, pulsed information that is transmitted on specific frequencies can be separated, in accordance with OFDM principles, despite the fact that the frequency channels overlap due to the limited time duration of the signals. OFDM generally requires a specific relationship between the data rate and the carrier frequencies. Specifically, the total signal frequency band is divided into N frequency sub-channels, each of which has the same data rate 1/T. These data streams are then multiplexed onto a plurality of carriers that are separated in frequency by 1/T. Multiplexing signals under these constraints results in each carrier having a frequency response that has response zeroes at multiples of 1/T. Therefore, there is no interference between the various sub-carrier channels, despite the fact that the channels overlap each other due to the broadening associated with the data rate and intermittent transmission.

Parallel data transmission is a technique related to FDMA. It is also referred to as multi-carrier transmission (MCT), as mentioned above. MCT has significant calculational advantages over simple FDMA. In this technique, each user's information is divided and transmitted over different frequencies rather than over a single frequency, as in standard FDMA. In an example of this technique, input data at NF bits per second are grouped into blocks of N bits at a data rate of F bits per second. N carriers are then used to transmit these bits, each carrier transmitting F bits per second. The carriers can be spaced in accordance with the principles of OFDM. Respecting MCT systems and the use of pulsed or intermittent signals, the same spectral spreading discussed above does occur. Designers employ various techniques to minimize this problem. Channel matching filters are frequently employed to control spectral spreading. Such filters can be implemented with fast Fourier transforms ("FFT's"), with certain finite impulse response filters, such as Nyquist filters, and through the implementation of other techniques as are understood by those skilled in the art. There are other approaches to minimizing this problem, including selection of sub-channelization and guard-band widths to maintain adequate margin in the channel spacing plan.

Both the phase and the amplitude of the carrier can be varied to represent the information in MCT (and OFDM) systems. Accordingly, multi-carrier transmission can be implemented with M-ary digital modulation schemes. In an M-ary modulation scheme, two or more bits are grouped together to form symbols and one of the M possible signals is transmitted during each symbol period. Examples of M-ary digital modulation schemes include Phase Shift Keying (PSK), Frequency Shift Keying (FSK), and higher order Quadrature Amplitude Modulation (QAM). In QAM a signal is represented by the phase and amplitude of a carrier wave. In high order QAM, a multitude of points can be distinguished on an amplitude/phase plot. For example, in 16-ary QAM, sixteen such points can be distinguished. Since four bits of zeros and ones can take on sixteen different combinations, a four-bit sequence of data symbols can, for example, be modulated onto a carrier in 16-ary QAM by transmitting only one value set of phase and amplitude, out of the possible sixteen such sets.

In both multi-carrier transmission and OFDM systems, the encoding and decoding can occur either coherently or differentially. Coherent detection techniques generally require that the channel be somehow estimated to obtain an absolute reference to phase and/or amplitude for each sub-carrier. In contrast, differential detection does not perform any channel estimation, thereby reducing complexity and eliminating the need for any pilot tones or other reference encoding techniques. Rather, differential detection compares each transmitted carrier state with another transmitted carrier state to establish the change in phase or amplitude between the two, which is defined as a symbol of information. Information is encoded as the difference in phase and/or amplitude between carrier states, and, decoding is accomplished by detecting the difference in phase and/or amplitude between carrier states.

Differential detection is affected by various noise sources, including Doppler shift, multi-path distortion, Rayleigh fading, and other noise. The ability to decode information is greatly affected by such noise sources, and it is therefore desirable to reduce the effects caused by such noise. As the symbol decoding in the differential decoding process are taken from positions further apart in either time or frequency, the affects of noise increase. The originally transmitted information is correlated in time and frequency as it is generated, and the effects of noise tend to decorrelate the information. Therefore, designers of differential detection system almost universally specify that differential detection occur between adjacent carrier states, adjacency being defined in terms of either time or frequency. This technique minimizes the de-correlation effects of noise. Since the information is encoded as the difference between carrier states, the first transmitted carrier state contains no decodable information in and of itself. The second through the last carrier states do contain information when compared to the previous, adjacent, carrier state. In a continuously transmitting system, the fact that the first transmitted carrier state contains no information does not represent the loss of any significant amount of information.

In the case of pulse or intermittent transmission systems, the fact that differential encoding and decoding requires two carrier states for the transmission of each symbol can result in a loss of information, and therefore a loss in system performance, which is typically measured as a reduced signal to noise ratio. A typical prior art differential encoding/decoding system that employs multiple sub-carriers to transmit intermittent signals can operate in one of two ways. In the first case, N−1 symbols are encoded across N frequencies by transmitting a group of N sub-carriers simultaneously. A first sub-carrier state at a first frequency is used as the reference to an adjacent frequency sub-carrier state, the differential between the two encoding a single symbol. The next adjacent sub-carrier is a compared to the previous and so forth until the sequential difference between all of the transmitted sub-carriers is assessed to decode the N−1 symbols of information. In the second scenario, N−1 symbols are encoded on each sub-carrier across N intervals in time. Each sub-carrier state at the first interval in time is compared to the same sub-carrier's state at the second interval in time. The sequence proceeds through all N intervals.

The arrangement of a certain number of sub-carriers over a certain number of symbol intervals, that is used to transmit each interval block of data, can be conceptualized as an array (which dimensions are the number of sub-carriers by the number of symbol intervals) for encoding and decoding the transmitted symbols. Since the number of symbols encoded is N−1 for either the number of sub-carriers or the number of symbol intervals, there is always a corresponding reduction in performance associated with such systems.

Available bandwidth is always constrained in a communication system design. Either by limited allocation of radio spectrum in the case of radio transmission systems, or in limited transmission capabilities of wireline systems, which include inductive, resistive, and capacitive losses. Time is usually constrained as well, either by the need for systems to emulate real-time responsiveness, or by the requirement to maximize the data throughput of the system. Thus, there is a need in the art to improve the performance of differentially encoded data communication systems which operate on a plurality of sub-carrier by transmitting intermittent, or pulsed, information blocks.

SUMMARY OF THE INVENTION

The need in the art is addressed by the methods and apparatuses of the present invention. The present invention teaches an apparatus that differentially encodes symbols. The apparatus includes a differential encoder that is operable to encode a first symbol as the difference between a first carrier state and an adjacent carrier state at a first symbol interval. And, that is operable to encode a second symbol as the difference between the first carrier state at the first symbol interval and the first carrier state at an adjacent symbol interval. The apparatus also includes a modulator coupled to the differential encoder that modulates the symbols onto a signal. There is also taught a corresponding differential decoder apparatus. It includes a demodulator that is operable to receive a signal and demodulate at least two sub-carriers from it. It also includes a decoder coupled to the demodulator that is operable to decode a first symbol as the difference between a first carrier state and an adjacent carrier state at a first symbol interval, and that is operable to decode a second symbol as the difference between the first carrier state at the first symbol interval and the first carrier state at an adjacent symbol interval.

The present invention also teaches a transmitter for encoding symbols on a plurality of sub-carriers at a plurality of symbol intervals. The transmitter includes a differential encoder that is operable to receive binary data and to output a digital signal. The digital signal encodes the binary data as symbols that are the difference between the states of at least a first and second adjacent sub-carriers at a particular symbol interval, and, that are the difference between the states of a sub-carrier one or more first and second adjacent symbol intervals. The transmitter also includes a digital to analog converter coupled to receive and convert the digital signal to an analog signal, and to output the analog signal. Also, a modulator coupled to the digital to analog converter to receive and modulate the analog signal onto a carrier signal. A corresponding receiver for decoding symbols differentially encoded on a plurality of sub-carriers at a plurality of symbol intervals is also taught. The receiver includes a demodulator that has an input for receiving a plurality of sub-carriers, and the demodulator is operable to demodulate and output an analog signal. The receiver also includes an analog to digital converter coupled to receive the analog signal from the demodulator and to output a digital signal. Also, a differential decoder coupled to receive the digital signal from the analog to digital converter, and operable to compare the state of at least a first and second adjacent sub-carrier at a given symbol interval to decode at least a first symbol across frequency as the difference in the sub-carriers' states, and that is operable to compare the state of a sub-carrier at one or more pairs of adjacent symbol intervals to decode at least a first symbol across time as the difference is the sub-carrier states, and finally output the symbols.

The present invention also teaches a method of differentially encoding symbols. The method includes the steps of encoding a first symbol as the difference between a first carrier state and an adjacent carrier state at a first symbol interval, and encoding a second symbol as the difference between the first carrier state at the first symbol interval and the first carrier state at an adjacent symbol interval. A corresponding method of differentially decoding symbols is also taught. This method includes the steps of decoding a first symbol as the difference between a first carrier state and an adjacent carrier state at a first symbol interval, and, decoding a second symbol as the difference between the first carrier state at the first symbol interval and the first carrier state at an adjacent symbol interval.

The present invention also teaches a method of differentially encoding packets on a plurality of sub-carriers at a plurality of symbol intervals. The method includes the steps of modulating the state of at least a first and second adjacent sub-carriers at a given symbol interval to encode at least a first symbol across frequency as the a difference in sub-carrier states, and modulating the state of a sub-carrier at at least a first and second adjacent symbol intervals to encode at least a first symbol across time as the difference between adjacent symbol intervals. There is also a corresponding method of decoding data packets that contain data symbols differentially encoded on a plurality of sub-carriers at a plurality of symbol intervals. The method includes the steps of comparing the state of at least a first and second adjacent sub-carrier at a symbol interval to decode at least a first symbol across frequency as the difference in the sub-carriers' states, and, comparing the state of a sub-carrier at at least a first and second adjacent symbol intervals to decode at least a first symbol across time as the difference in the sub-carrier states.

The present invention also teaches a method of differentially encoding data packets on a plurality of sub-carriers. In this method, in a first symbol interval, is the step of modulating the state of each sub-carrier to sequentially encode a set of symbols across frequency as the difference between adjacent sub-carrier states from a first sub-carrier state to a last sub-carrier state. Then, for each subsequent symbol interval in the data packet, the step of modulating a first sub-carrier state to encode a symbol across time as the difference in sub-carrier state with respect to the last sub-carrier state in the pervious symbol interval. Then, for each of the subsequent symbol intervals, the step of modulating the state of each sub-carrier to sequentially encode a set of symbols across frequency as the difference between adjacent sub-carrier states from the first sub-carrier state to a last sub-carrier state. In a corresponding method of decoding data packets that contain data symbols differentially encoded on a plurality of sub-carriers, there is the step of receiving the plurality of sub-carriers for the duration of a data packet. Then, in a first symbol interval, the step of sequentially comparing the difference between adjacent sub-carrier states from a first sub-carrier state to a last sub-carrier state to decode a first set of symbols across frequency. Then, for each subsequent symbol interval in the data packet, the step of comparing a first sub-carrier state with the last sub-carrier state in the previous symbol interval to decode a symbol across time. Finally, for each of the subsequent symbol intervals, the step of sequentially comparing the difference between adjacent sub-carrier states from the first sub-carrier state to a last sub-carrier state in the present symbol interval to decode a subsequent set of symbols across frequency.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
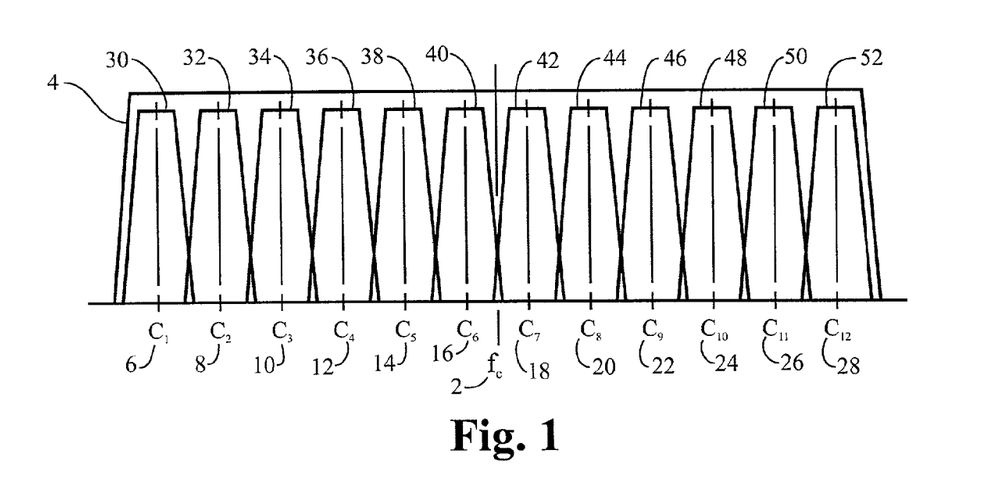
FIG. 1 is a spectrum allocation diagram according to an illustrative embodiment of the present invention.

Reference is directed to FIG. 1, which is a spectrum channelization diagram of an illustrative embodiment of the present invention. This illustration is directed toward a radio communications implementation of the present invention, although, the present invention is equally applicable to a system employing wireline or fiber communications. In a radio environment, a center frequency $f_c$ 2 would be allocated by the Federal Communications Commission. The spectrum allocation would define a band of frequencies identified by an emissions mask 4, as is understood by those of ordinary skill in the art. As was discussed herein before, there are benefits to employing a multiple sub-carrier protocol for the communication of digital information. Such a protocol defines a plurality of sub-bands centered around sub-carriers $C_1$ 6, $C_2$ 8, $C_3$ 10, $C_4$ 12, $C_5$ 14, $C_6$ 16 $C_7$ 18, $C_8$ 20, $C_9$ 22, $C_{10}$ 24, $C_{11}$ 26, and $C_{12}$ 28 which correspond to the defined sub-carrier spectral masks 30, 32, 34, 36, 38, 40, 42, 44, 46, 48, 50, and 52 respectively in FIG. 1.

Twelve sub-carriers are contemplated in FIG. 1 as well as in other figures below. This number was selected by way of example only. In other illustrative embodiments, other quantities of sub-carriers, bandwidths of sub-carriers, as well as other numbers of symbol intervals may be chosen based on bandwidth, data rates, noise environment, and other design factors. Table 1 below indicates several reasonable configurations based on a 700 MHz model with the noted bandwidths and environmental factors. Table 1 addresses three potential FCC spectrum allocations with 50 kHz, 100 kHz and 150 kHz bandwidths. For each of these, three models were calculated having 4.0 kHz, 4.8 kHz, and 2.4 kHz sub-carriers. The number of these for each channel is indicated in the first column of Table 1, and they range from 7 sub-channels to 51 sub-channels in number. The total throughput in bits is indicated for each example. The bit error rate in a 13 dB Eb/N0 environment is calculated for both ITU Vehicular A and B channels, with the delay times noted below. See Rec. ITU-R M1.225, "Guidelines for the Evaluation of Radio Transmission Technology from IMT-2000 (2000) for reference. Those of ordinary skill in the art will appreciate the design trade-offs to be made in contemplating a system design according to the present invention. In any event, it is clear that when dual domain (time and frequency) differential decoding is employed, there is an improvement in noise margin. It ranges from about 2% to over 14%, which is a significant improvement over the prior art, an improvement that is accomplished without a component cost increase, and little processor overhead increase.

TABLE 1

| | Throughput Bits | BER @ 13.0 dB Eb/N0 | | | |
|---|---|---|---|---|---|
| | | Veh A* M1*** | Veh A* M2**** | Veh B** M1*** | Veh B** M2**** |
| 50 kHz Channels | | | | | |
| 4.0k Baud × 9 | 144000 | 6.50% | 4.75% | 9.70% | 9.90% |
| 4.8k Baud × 7 | 134400 | 6.10% | 5.60% | 8.30% | 10.50% |
| 2.4k Baud × 16 | 153600 | 6.70% | 5.20% | 10.30% | 8.60% |
| 100 kHz Channels | | | | | |
| 4.0k Baud × 19 | 304000 | 5.25% | 5.74% | 9.20% | 8.60% |
| 4.8k Baud × 16 | 307200 | 5.30% | 4.60% | 8.30% | 10.60% |
| 2.4k Baud × 33 | 316800 | 6.90% | 6.30% | 10.00% | 8.90% |
| 150 kHz Channels | | | | | |
| 4.0k Baud × 30 | 480000 | 6.90% | 4.80% | 10.70% | 11.90% |
| 4.8k Baud × 25 | 480000 | 5.40% | 4.70% | 10.30% | 10.60% |
| 2.4k Baud × 51 | 489600 | 7.50% | 4.70% | 10.60% | 10.20% |

Table 1 Notes:
*ITU Vehicular A Channel with 2.51 μs delay spread.
**ITU Vehicular B Channel with 20 μs delay spread.
***M1 is differential in time only.
****M2 is differential in time and frequency.

Figure 2:
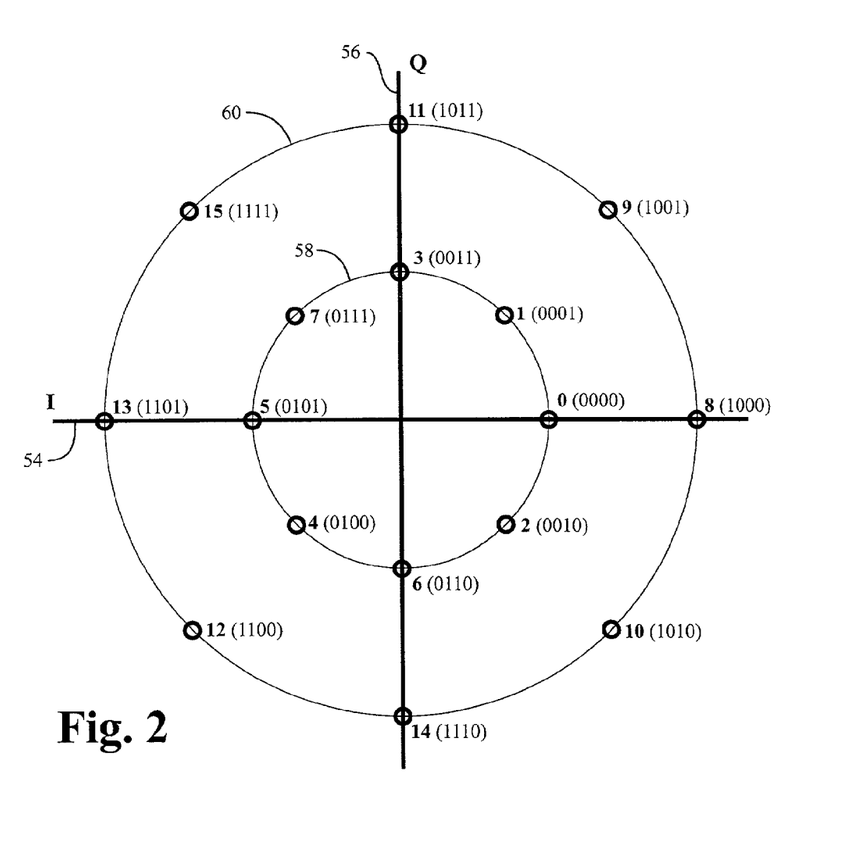
FIG. 2 is a constellation diagram of the symbol coding according to an illustrative embodiment of the present invention.

Reference is directed to FIG. 2, which is a constellation diagram of a 16-QAM modulated signal according to an illustrative embodiment of the present invention. In QAM, information is modulated in both phase and amplitude. FIG. 2 represents this information along the in-phase ("I") axis 54 and quadrature-phase ("Q") axis 56. Sixteen (4 bits per baud) points, numbered according to the decimal equivalent to the binary value each symbol on the constellation encodes, appear on the constellation, see generally FIG. 2. Thus, it will be appreciated that there are two amplitude levels and eight phase angle positions used to encode the data onto the constellation. This creates an inner ring 58 and an outer ring 60, around which all of the constellation points are located, in this illustrative embodiment. Information is encoded as the change in carrier (or sub-carrier) phase and amplitude state at given symbol intervals. Thus, it is not necessary for the receiver/decoder to have an absolute reference to either of phase or amplitude. Rather, all that is needed is two adjacent symbols, so that the change in amplitude and phase can be determined, thus indicating which symbol has been received. It should be noted that the present invention exists and is useful independent of what modulation scheme is employed, so long as the scheme can be decoded by differential means. Thus, the present invention is equally applicable to PSK, FSK, M-ary-QAM, QPSK, and other hybrid modulation schemes, as will be appreciated by those of ordinary skill in the art.

Figure 3:
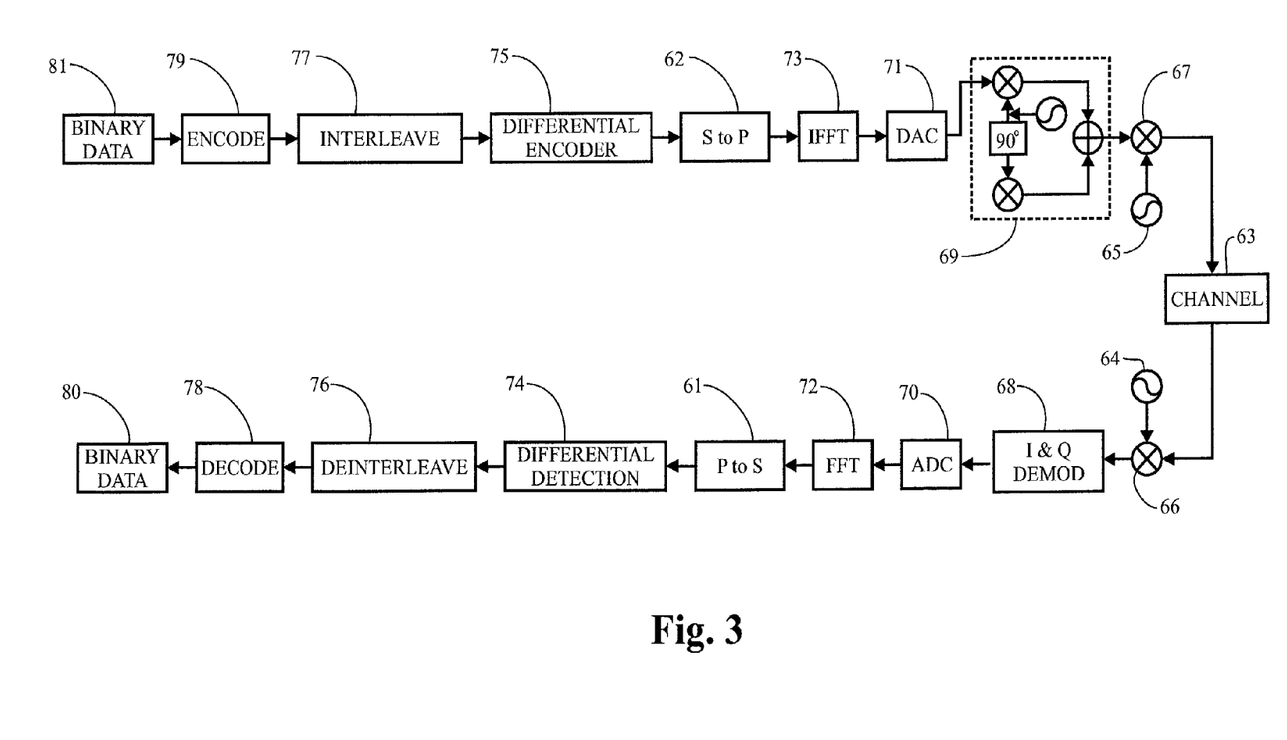
FIG. 3 is a functional block diagram of a data receiver according to an illustrative embodiment of the present invention.

Reference is directed to FIG. 3, which is a functional block diagram of a transmitter/receiver pair coupled through a communications channel according to an illustrative embodiment of the present invention. At the transmitter/encoder side of the diagram, binary data 81 is input to an encoder 79. The binary data 81, may be voice, control or raw data, as is required by the system design. The encode function 79 is independent of the present invention, but may be, for example, Viterbi error encoding, Gray coding, vocoder encoding or the like. Next, at block 77, data interleaving may be employed, as is understood by those skilled in the art as a useful approach in managing the effects of bursty noise encountered in a mobile radio communications environment. Differential encoding, according to the present invention, occurs at block 75. Differential encoding 75 may be accomplished through the use of a digital signal processor or similar computing device as has been implemented and understood by those skilled in the art. A serial to parallel converter 62 is employed to distribute the data to a plurality of carriers, as is necessary for multi-carrier and ODFM transmission systems. A channel matching filter is employed to control spectral spreading. In this illustrative embodiment, an inverse fast Fourier transform (IFFT) 73 is used. A matched Nyquist filter, which is convolved with the receiver/decoder is also useful for this application. Such channel matching filters are understood by those skilled in the art. In this illustrative embodiment, the channel matching filter is implemented in the digital domain, again through use of a digital signal processor.

The filtered digital signal output from the channel match IFFT 73 is coupled to a digital to analog converter 71 which transforms the information into a base-band signal comprising both the in-phase and quadrature phase signals. These analog signals are coupled to a modulator 69 which generates an intermediate frequency (IF) 16-QAM signal that is coupled to mixer 67. Mixer 67 mixes the IF with the radio frequency (RF) carrier oscillator 65 signal and outputs the modulated carrier to the channel 63. In this illustrative embodiment, the channel is a radio frequency channel.

The receiver side of the system receives the modulated RF signal from channel 63 and mixes it with an RF reference oscillator 64 signal in mixer 66. Mixer 66 outputs a modulated baseband signal to an I & Q demodulator 68, which outputs the in-phase and quadrature-phase base-band analog signals to analog to digital converter 70. The signal is converted to the digital domain in the analog to digital converter 70 and the corresponding channel matching filter 72 processes the signal, as described above. In the illustrative embodiment, an FFT is employed as a channel matching filter. The multiple carriers are converted to a single data stream in parallel to serial converter 61. Next, differential detection in both of the frequency and time domains occurs in differential detector 74. Note that a digital signal processor can readily be employed to accomplish the digital domain processing in this illustrative embodiment receiver/decoder. Deinterleaving 76 and decoding 78 are done in correspondence with the encoding and interleaving noted above. Finally, the binary data is output from the receiver/decoder at block 80. The present invention is implemented within the differential encoder 75 and differential decoder 74 by utilizing a decoding scheme in both the time and frequency domain, which will be more fully developed herein after.

Figure 4:
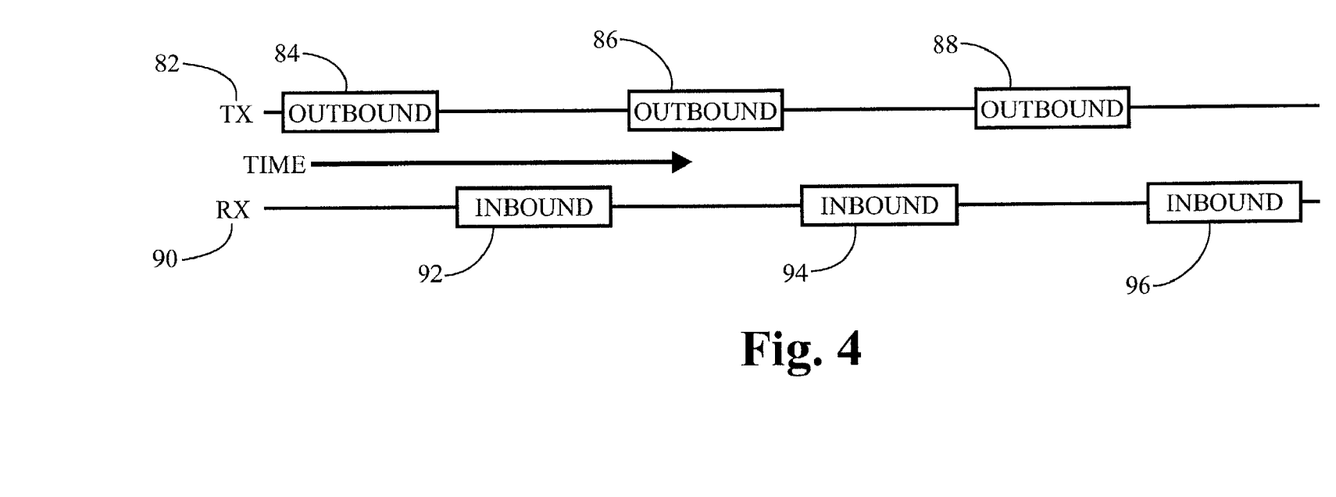
FIG. 4 is a data packet timing diagram according to an illustrative embodiment of the present invention.

Reference is direct to FIG. 4, which is a packet transmission timing diagram according to an illustrative embodiment of the present invention. One aspect of the present invention is the pulsed, or intermittent, signal transmission characteristic. FIG. 4 details an illustrative embodiment that is appropriate for the two-way land mobile radio environment in which a multi-carrier transmission system architecture is employed. In such an environment, terminal units move about within a service area and communicate bidirectionally with a repeater station. Communications are used for voice, data, and system control. Within one or more sub-channels, information is sent in packets back and forth between terminal units and a repeater station. From the perspective of a terminal unit, transmissions 82 are sent in OUTBOUND packets 84, 86, and 88, which are interspersed in time. In one embodiment, the packets each comprise one hundred-twenty 16-QAM symbols, each having a symbol interval of 4 μs. Multiple terminal units simultaneously access multiple sub-carriers. During the quiet interval between OUTBOUND packets, the receiver receives 90 INBOUND packets 92, 94, and 96, which are arranges in similar fashion to the OUTBOUND packets.

Figure 5:
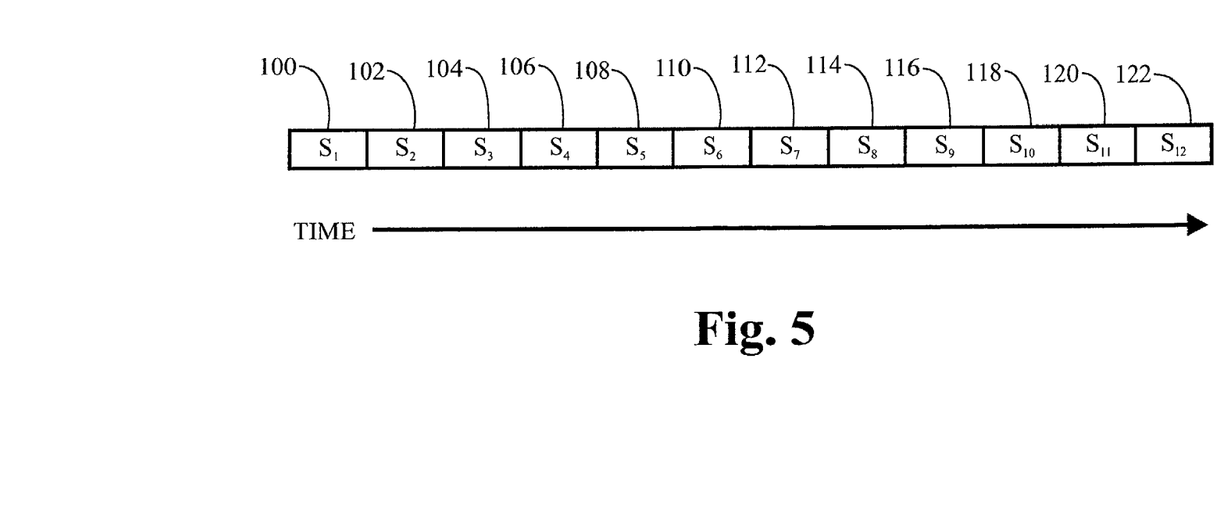
FIG. 5 is a data packet diagram according to an illustrative embodiment of the present invention.

FIG. 5 is a data packet timing diagram of another illustrative embodiment of the present invention. In this example, there are twelve symbol intervals, which are identified as $S_1$ 100, $S_2$ 102, $S_3$ 104, $S_4$ 106, $S_5$ 108, $S_6$ 110, $S_7$ 112, $S_8$ 114, $S_9$ 116, $S_{10}$ 118, $S_{11}$ 120, and $S_{12}$ 122. Since such a system would transmit information on multiple sub-carriers, at multiple symbol intervals, it is a good candidate for the advantages taught by the present invention. Regarding the following discussion, an illustrative embodiment systems that transmits symbols over twelve symbol intervals, as illustrated in FIG. 5, and that employs twelve sub-carriers within a single band of frequencies will be used by way of example. Those skilled in the art will appreciate that numerous other arrangements of bandwidth, symbol intervals, and modulations schemes would be equally applicable to the teachings of the present invention.

Figure 6:
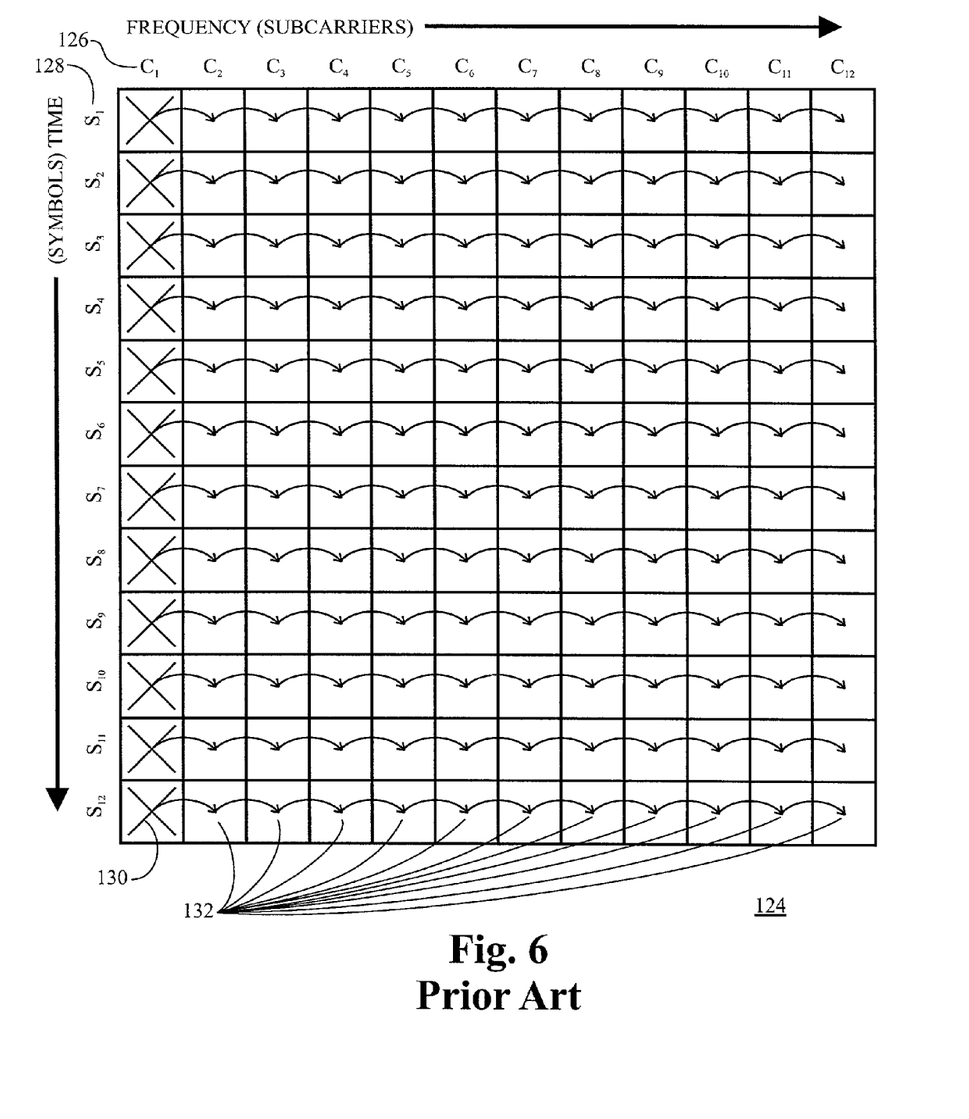
FIG. 6 is a prior art differential symbol decoding sequence diagram.

Reference is directed to FIG. 6, which is an encoding and decoding diagram of a differential detection scheme as applied in the prior art. This example is illustrated as a twelve by twelve matrix 124 representing the aforementioned twelve symbol intervals 128, labeled as $S_1, S_2, S_3, S_4, S_5, S_6, S_7, S_8, S_9, S_{10}, S_{11}$, and $S_{12}$, and, twelve sub-carriers 126, labeled as $C_1, C_2, C_3, C_4, C_5, C_6, C_7, C_8, C_9, C_{10}, C_{11}$, and $C_{12}$. This illustration is one where differential detection across frequency is employed. Thus, the twelve carrier states that occur at the first symbol interval $S_1$ are differentially encoded/decoded to produce eleven symbols of information. Thus, there is no information encoded by the first sub-carrier state at symbol interval $C_1$ because it is a reference only to the subsequent sub-carrier $C_2$, and this is true for each of the twelve symbol intervals. A carrier state in the symbol interval that is used as a reference only is indicated by an 'X' 130 placed within the matrix 124 at that position. A review of FIG. 6 demonstrates that there are twelve 'X's' and therefore twelve of the one hundred forty-four matrix cells do not encode useful information, but rather are references only for the differential decoding with respect to the next, adjacent matrix cell. The encoding/decoding operations occur across frequency by comparing first the reference symbol 130 successively with each adjacent carrier state 132 until eleven symbols are differentially encoded/decoded.

Figure 7:
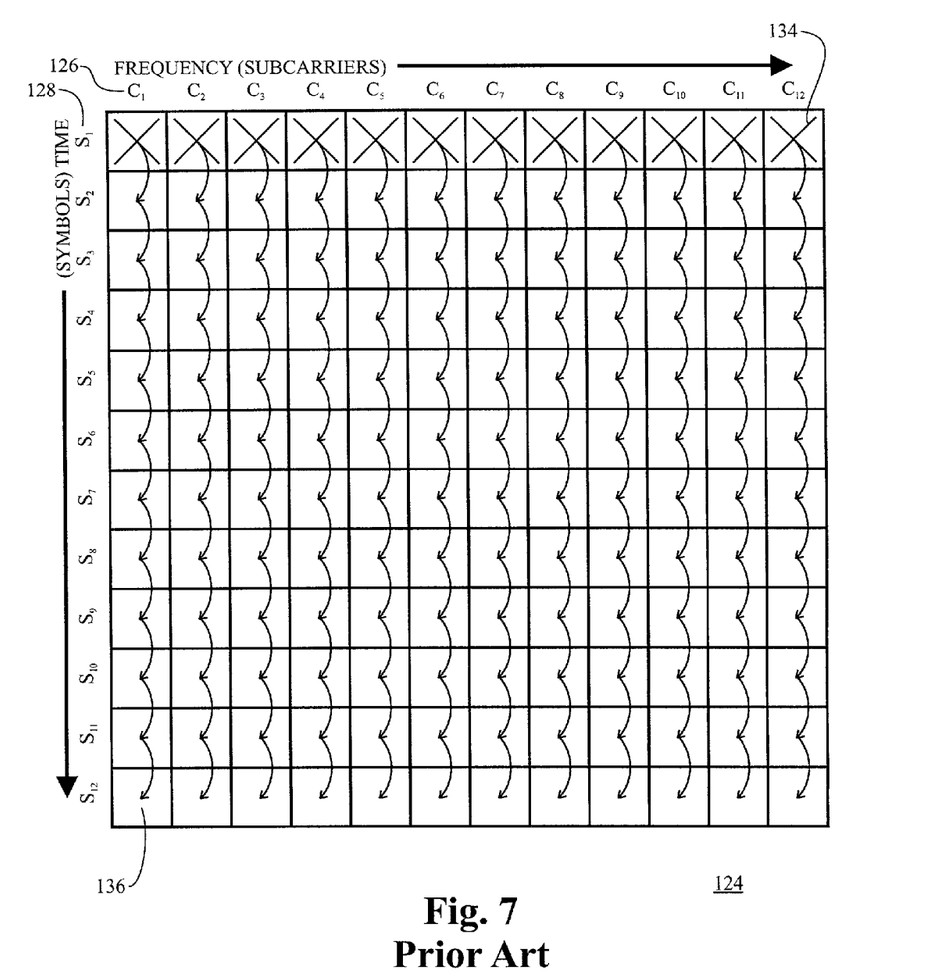
FIG. 7 is a prior art differential symbol decoding sequence diagram.

FIG. 7 is an encoding and decoding diagram of a differential detection scheme as applied in the prior art. It is very similar to that illustrated in FIG. 6, except that in FIG. 7 the encoding/decoding occur across time, rather than across frequency. Again, this example is illustrated as a twelve by twelve matrix 124 representing twelve symbol intervals 128, labeled as $S_1, S_2, S_3, S_4, S_5, S_6, S_7, S_8, S_9, S_{10}, S_{11}$, and $S_{12}$, and, twelve sub-carriers 126, labeled as $C_1, C_2, C_3, C_4, C_5, C_6, C_7, C_8, C_9, C_{10}, C_{11}$, and $C_{12}$. The first reference carrier states 134 all occur during the first symbol interval $S_1$ and then differential encode/decode occur successively across time 136. Thus, the first twelve carrier states that occur during the first symbol interval $S_1$ provide a reference only to the subsequent adjacent carrier state, and do not encode/decode a symbol of information in and of themselves. They are so indicated by the 'X' at each matrix cell location. It is apparent then that whether differential encoding/decoding occur across time or frequency there is a substantial percentage of carrier states that do not carrier information.

Figure 8:
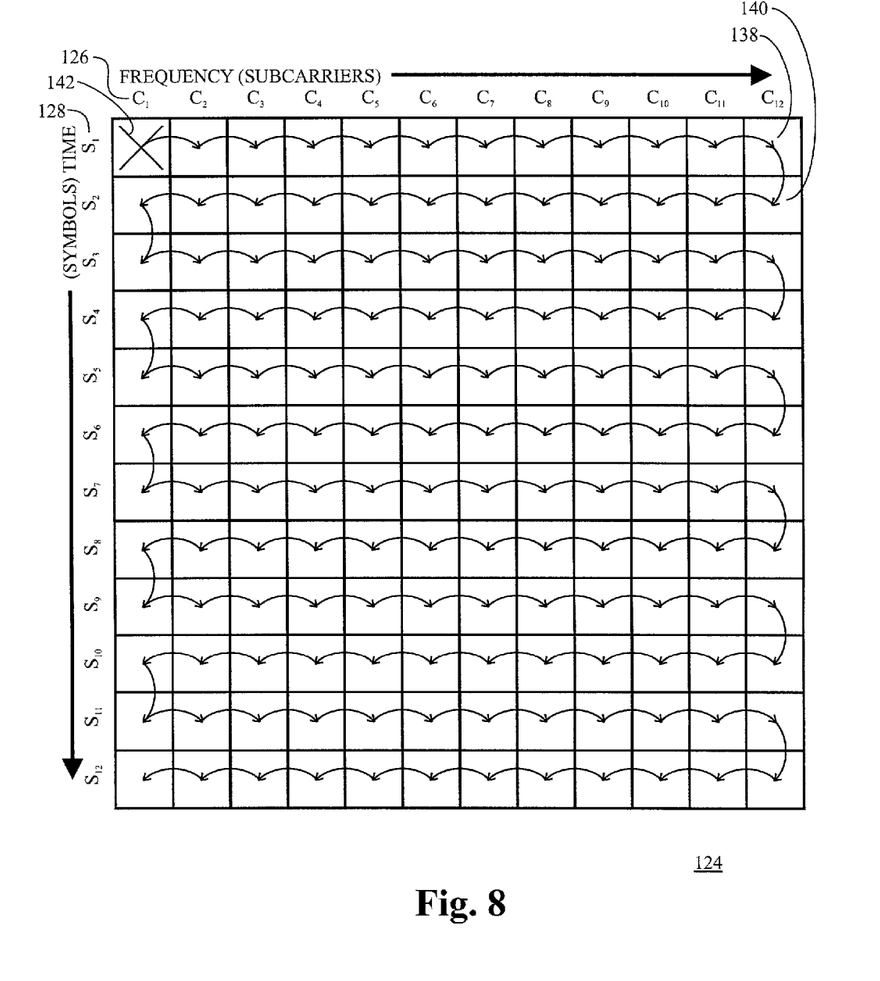
FIG. 8 is a differential symbol decoding sequence diagram according to an illustrative embodiment of the present invention.

Reference is directed to FIG. 8, which is an encode/decode matrix diagram 124 that illustrates an embodiment of the present invention. Again, the matrix is dimensioned by twelve symbol intervals 128, labeled as $S_1, S_2, S_3, S_4, S_5, S_6$, $S_7, S_8, S_9, S_{10}, S_{11}$, and $S_{12}$, and, twelve sub-carriers 126, labeled as $C_1, C_2, C_3, C_4, C_5, C_6, C_7, C_8, C_9, C_{10}, C_{11}$, and $C_{12}$. Since it is now appreciated that differential encoding/decoding can occur across time or across frequency, and that it is important to do so with respect to an adjacent carrier state (adjacency measured in either of time or frequency) to control decorrelation, the advancement of the present invention can be appreciated. A first carrier state 142 which occurs on a first sub-carrier, $C_1$, at a first symbol interval, $S_1$, is used as a reference to an adjacent carrier states across frequency, which is $C_2$ at $S_1$, in FIG. 8. Each adjacent sub-carrier is sequentially differentially encoded/decoded across frequency at that particular symbol time interval until the last carrier state 138. The last carrier state occurs on sub-carrier $C_{12}$ at symbol interval $S_1$. Rather than resetting to the next row in time, the present invention teaches that a symbol is encoded/decoded between the last carrier state ($C_{12},S_1$) 138 and the next adjacent carrier state in frequency ($C_{12},S_2$) 140. By use of this approach, an additional reference only carrier state is not consumed for encoding/decoding without communicating useful information. Encoding/decoding then proceeds across frequency again, sequentially from carrier to carrier at symbol interval $S_2$ until the end is again reached at ($C_1,S_2$). The process repeats, encoding/decoding across frequency, then time, then frequency until the last carrier state ($C_1,S_{12}$) is reached. In this fashion, only a single carrier state 142 is used as a reference only state in the entire matrix. The net result in an increase in the number of communicated information symbols, without any increase in the number of sub-carriers or symbol intervals. Another aspect of the present invention that is to be appreciated is the utilization of different modulation schemes across the matrix. In other words, multi-modulation of different sub-carriers can be applied at different locations within the matrix. As is understood by those skilled in the art, the extreme edges in frequency are constrained by different guard band requirements, and thus a different modulation scheme can be advantageous, for example. Also, sometimes differential decoding in time can render worse performance than differential across frequency. By way of example, using DQPSK instead of 16-QAM can make the channel reliability higher, generally. If differential decoding is normally across frequency and only differential across time at the edges of the matrix, the edge sub-carrier reliability can be enhanced at the edge sub-carrier by using DQPSK at the edge matrix transitions, and 16-QAM elsewhere. Those skilled in the art will appreciate that various modulation schemes could be readily employed depending of the matrix, channel characteristics, and so forth.

Figure 9:
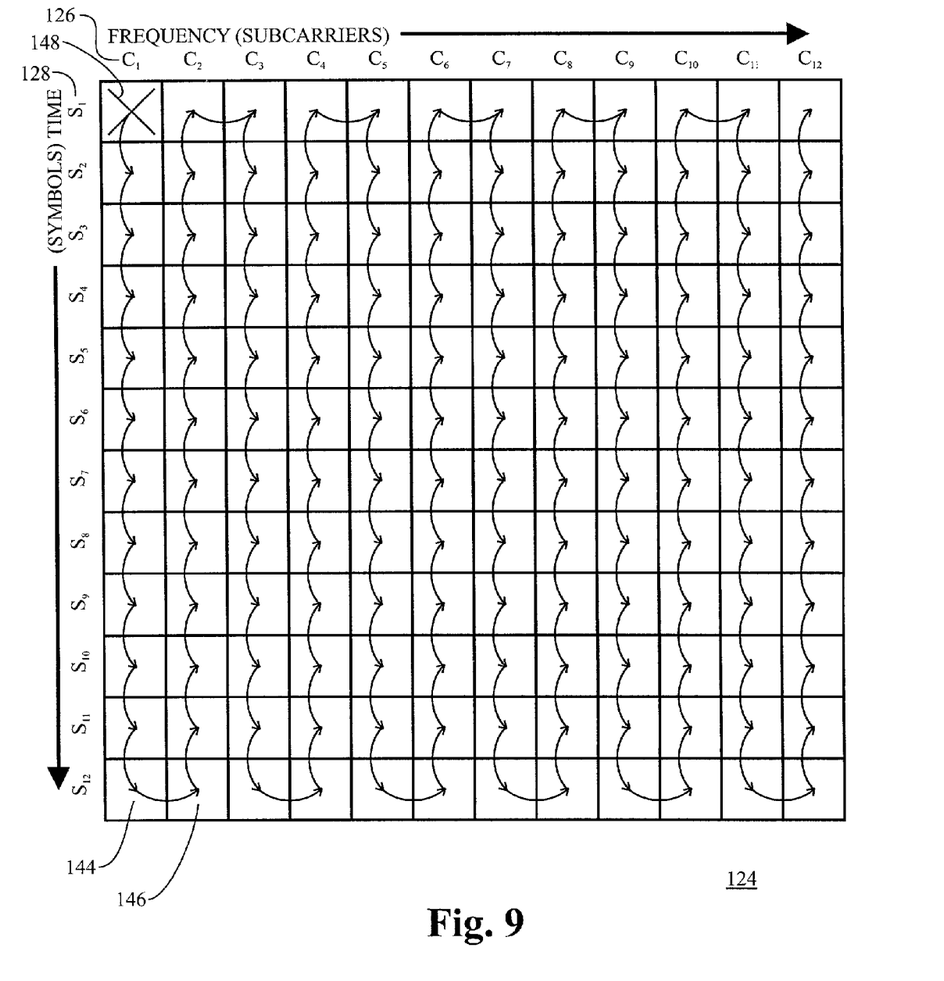
FIG. 9 is a differential symbol decoding sequence diagram according to an illustrative embodiment of the present invention.

Reference is directed to FIG. 9, which is an encode/decode matrix diagram 124 that illustrates an embodiment of the present invention. Again, the matrix is dimensioned by twelve symbol intervals 128, labeled as $S_1, S_2, S_3, S_4, S_5, S_6$, $S_7, S_8, S_9, S_{10}, S_{11}$, and $S_{12}$, and, twelve sub-carriers 126, labeled as $C_1, C_2, C_3, C_4, C_5, C_6, C_7, C_8, C_9, C_{10}, C_{11}$, and $C_{12}$. This illustrative embodiment is very similar to that in FIG. 8, except that the order of encoding decoding is by time first, then by frequency. The carrier state 148 at symbol interval $S_1$ on sub-carrier $C_1$ is the first reference point. The differential encoding/decoding process is done across time first to symbol interval $S_2$, then $S_3$ on sub-carrier $C_1$ until the last carrier state 144 is reached. The next differentially encoded symbol is across frequency to carrier state 146 ($S_{12},C_2$). The process repeats decoding across time, then frequency, then time and so forth until the last carrier state is reached.

Figure 10:
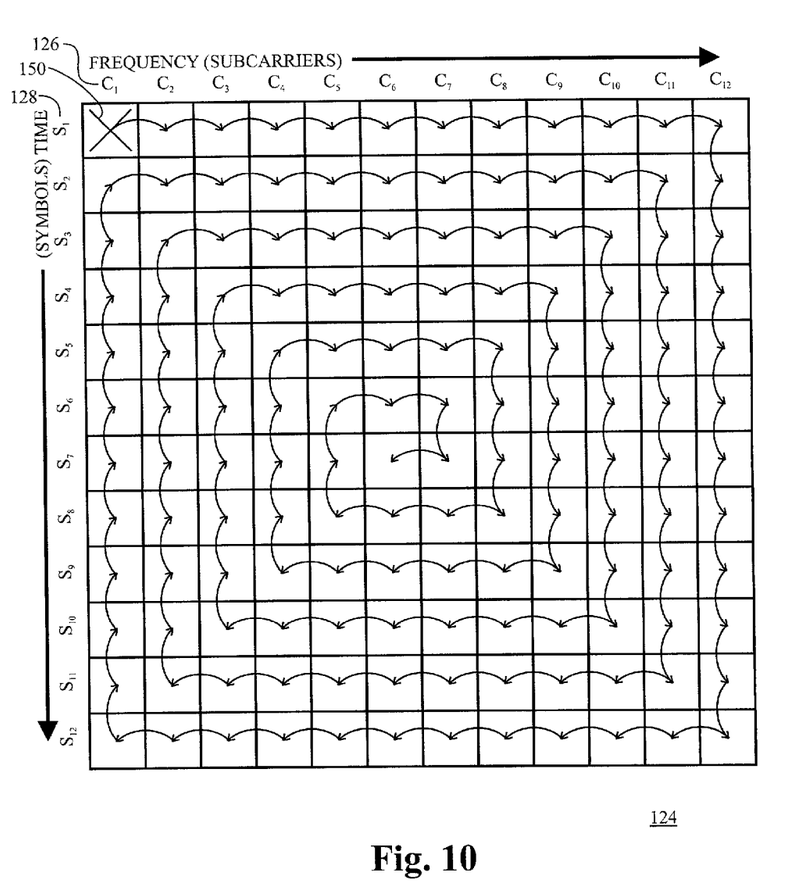
FIG. 10 is a differential symbol decoding sequence diagram according to an illustrative embodiment of the present invention.

The orderly approach illustrated in FIG. 8 and FIG. 9 seems logical and may be preferred. However, once it is appreciated that differential encoding/decoding can be accomplished within dual domains, time and frequency, in any given packet, the course followed though the matrix of sub-carriers and symbol intervals can follow many possible paths. Reference is directed to FIG. 10, which is an illustrative embodiment of one such alternative path. Again, the matrix 124 in FIG. 10 is dimensioned by twelve symbol intervals 128, labeled as $S_1, S_2, S_3, S_4, S_5, S_6, S_7, S_8, S_9, S_{10}, S_{11}$, and $S_{12}$, and, twelve sub-carriers 126, labeled as $C_1, C_2, C_3, C_4, C_5, C_6, C_7, C_8, C_9, C_{10}, C_{11}$, and $C_{12}$. The first reference carrier state 150 occurs at symbol interval $S_1$ on sub-carrier $C_1$. However, as illustrated by the arrows showing the differential path, the course through the matrix appears to follow a spiral path, rather than a set of rows and columns. The approach is valid and performance is maximized when the rule of adjacency is followed. Of course, the spiral path illustrated in FIG. 10 is but one of many that could be employed. Virtually any serpentine path that employs the dual domain approach taught herein and that follows the rule of adjacency could be employed.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. An apparatus for differentially encoding symbols, comprising:
    a differential encoder operable to encode a first symbol as the difference between a first sub-carrier state at a first symbol interval and an adjacent sub-carrier state at said first symbol interval, and operable to encode a second symbol as the difference between said first sub-carrier state at said first symbol interval and said first sub-carrier state at an adjacent symbol interval, and
    a modulator coupled to said differential encoder and operable to modulate said symbols onto a signal.

2. An apparatus for differentially decoding symbols, comprising:
    a demodulator, operable to receive a signal and demodulate at least two sub-carriers therefrom, and
    a decoder coupled to said demodulator and operable to decode a first symbol as the difference between a first sub-carrier state at a first symbol interval and an adjacent sub-carrier state at said a first symbol interval, and operable to decode a second symbol as the difference between said first sub-carrier state at said first symbol interval and said first sub-carrier state at an adjacent symbol interval.

3. A transmitter for encoding symbols on a plurality of sub-carriers at a plurality of symbol intervals, comprising:
    a differential encoder operable to receive binary data and to output a digital signal that encodes said binary data as symbols that are the difference between the states of at least a first and second adjacent sub-carriers at a first symbol interval, and, that are the difference between the state of said first adjacent sub-carrier at least said first symbol interval and an adjacent symbol interval;
    a digital to analog converter coupled to receive and convert said digital signal to an analog signal, and to output said analog signal, and
    a modulator coupled to said digital to analog converter to receive and modulate said analog signal onto a carrier signal.

4. A receiver for decoding symbols differentially encoded on a plurality of sub-carriers at a plurality of symbol intervals, comprising:
    a demodulator having an input for receiving said plurality of sub-carriers, said demodulator operable to demodulate and output an analog signal;
    an analog to digital converter coupled to receive said analog signal from said demodulator and to output a digital signal, and
    a differential decoder coupled to receive said digital signal from said analog to digital converter, and operable to compare the state of at least a first and second adjacent sub-carrier at a first symbol interval to decode at least a first symbol across frequency as the difference in said sub-carriers' states, and operable to compare the state of said first adjacent sub-carrier at least said first symbol interval and an adjacent symbol interval to decode at least a second symbol across time as the difference in said sub-carrier states, and operable to output said symbols.

5. A method of differentially encoding symbols, comprising the steps of:
    encoding a first symbol as the difference between a first sub-carrier state and an adjacent sub-carrier state at a first symbol interval, and
    encoding a second symbol as the difference between said first sub-carrier state at said first symbol interval and said first sub-carrier state at an adjacent symbol interval.

6. A method of differentially decoding symbols, comprising the steps of:
    decoding a first symbol as the difference between a first sub-carrier state and an adjacent sub-carrier state at a first symbol interval, and
    decoding a second symbol as the difference between said first sub-carrier state at said first symbol interval and said first sub-carrier state at an adjacent symbol interval.

7. A method of differentially encoding packets on a plurality of sub-carriers at a plurality of symbol intervals, comprising the steps of:
    modulating the states of at least a first and second adjacent sub-carriers at a first symbol interval to encode at least a first symbol across frequency as the a difference in the sub-carrier states, and
    modulating the state of said first adjacent a sub-carrier at least said first symbol interval and an adjacent symbol interval to encode at least a first symbol across time as the difference in said sub-carrier states.

8. A method of decoding data packets that contain data symbols differentially encoded on a plurality of sub-carriers at a plurality of symbol intervals, comprising the steps of:
    comparing the states of at least a first and second adjacent sub-carriers at a first symbol interval to decode at least a first symbol across frequency as the difference in said sub-carriers' states;
    comparing the state of said first adjacent sub-carrier at least said first symbol interval and an adjacent symbol interval to decode at least a first symbol across time as the difference in said sub-carrier states.

* * * * *